United States Patent [19]
Milford et al.

[11] 4,338,072
[45] * Jul. 6, 1982

[54] APPARATUS FOR CRUSING PARTIALLY CURED FREELY RISEN FOAM

[75] Inventors: Alan H. Milford, Hamden; Oliver J. Proulx, Wallingford, both of Conn.

[73] Assignee: Olin Corporation, New Haven, Conn.

[*] Notice: The portion of the term of this patent subsequent to Jan. 16, 1996, has been disclaimed.

[21] Appl. No.: 90,200

[22] Filed: Nov. 1, 1979

Related U.S. Application Data

[60] Division of Ser. No. 932,246, Aug. 9, 1978, Pat. No. 4,134,945, which is a continuation-in-part of Ser. No. 738,262, Nov. 2, 1976.

[51] Int. Cl.³ .............................................. B29D 27/04
[52] U.S. Cl. ..................................... 425/371; 100/193; 264/54; 264/321; 264/DIG. 4; 425/817 C
[58] Field of Search ........................... 425/371, 817 C; 264/321, DIG. 4; 100/153

[56] References Cited

U.S. PATENT DOCUMENTS

| | | | |
|---|---|---|---|
| 1,423,020 | 7/1922 | Pokorny | 425/371 |
| 2,602,960 | 7/1952 | Fischbein | 425/371 |
| 2,779,969 | 2/1957 | Bose | 425/371 |
| 2,834,748 | 5/1958 | Bailey et al. | 528/29 X |
| 2,867,843 | 1/1959 | Browne et al. | 425/371 X |
| 3,072,582 | 1/1963 | Frost | 264/54 X |
| 3,112,524 | 12/1963 | Legler | 425/4 C |
| 3,506,600 | 4/1970 | Zocco et al. | 264/321 X |
| 3,680,476 | 8/1972 | Pfeiffer | 100/151 |
| 3,779,686 | 12/1973 | Kerttula et al. | 425/371 |
| 3,887,318 | 6/1975 | DeMets | 425/371 |
| 3,993,426 | 11/1976 | Ahrweiler et al. | 425/371 |
| 4,134,945 | 1/1979 | Milford et al. | 425/371 |
| 4,252,517 | 2/1981 | Milford et al. | 264/321 X |

FOREIGN PATENT DOCUMENTS

| | | | |
|---|---|---|---|
| 705938 | 3/1965 | Canada | |
| 2052159 | 4/1972 | Fed. Rep. of Germany | 425/371 |
| 2205575 | 8/1973 | Fed. Rep. of Germany | 425/371 |
| 2419706 | 11/1975 | Fed. Rep. of Germany | 425/371 |
| 477006 | 10/1975 | U.S.S.R. | 425/371 |

OTHER PUBLICATIONS

Ferrigno, T. H., "Rigid Plastics Foams", Second Edition, New York, Reinhold, ©1963, pp. 38–42.

*Primary Examiner*—Philip E. Anderson
*Attorney, Agent, or Firm*—Ralph D'Alessandro; Donald F. Clements; Thomas P. O'Day

[57] ABSTRACT

An improvement in the manufacture of flexible densified polyurethane foam wherein the partially cured freely risen foam is fed through a crush conveyor to minimize the density gradient throughout the vertical cross section. The crush conveyor includes an upper crushing section which is arcuate and has a radius of a dimension such that the ratio of the radius of the arc to height of the partially cured freely risen foam is 1.1 to 1 or greater. The crush conveyor has a bottom crushing section which may be arcuate with a radius of a dimension such that the ratio of its radius to the height of the partially cured freely risen foam is also 1.1 to 1 or greater. The radius of the bottom arcuate crushing section may be the same or larger than the radius of the top arc. As an alternative, the bottom crushing section may be planar and may be horizontal, or inclined with respect to the horizontal.

5 Claims, 4 Drawing Figures

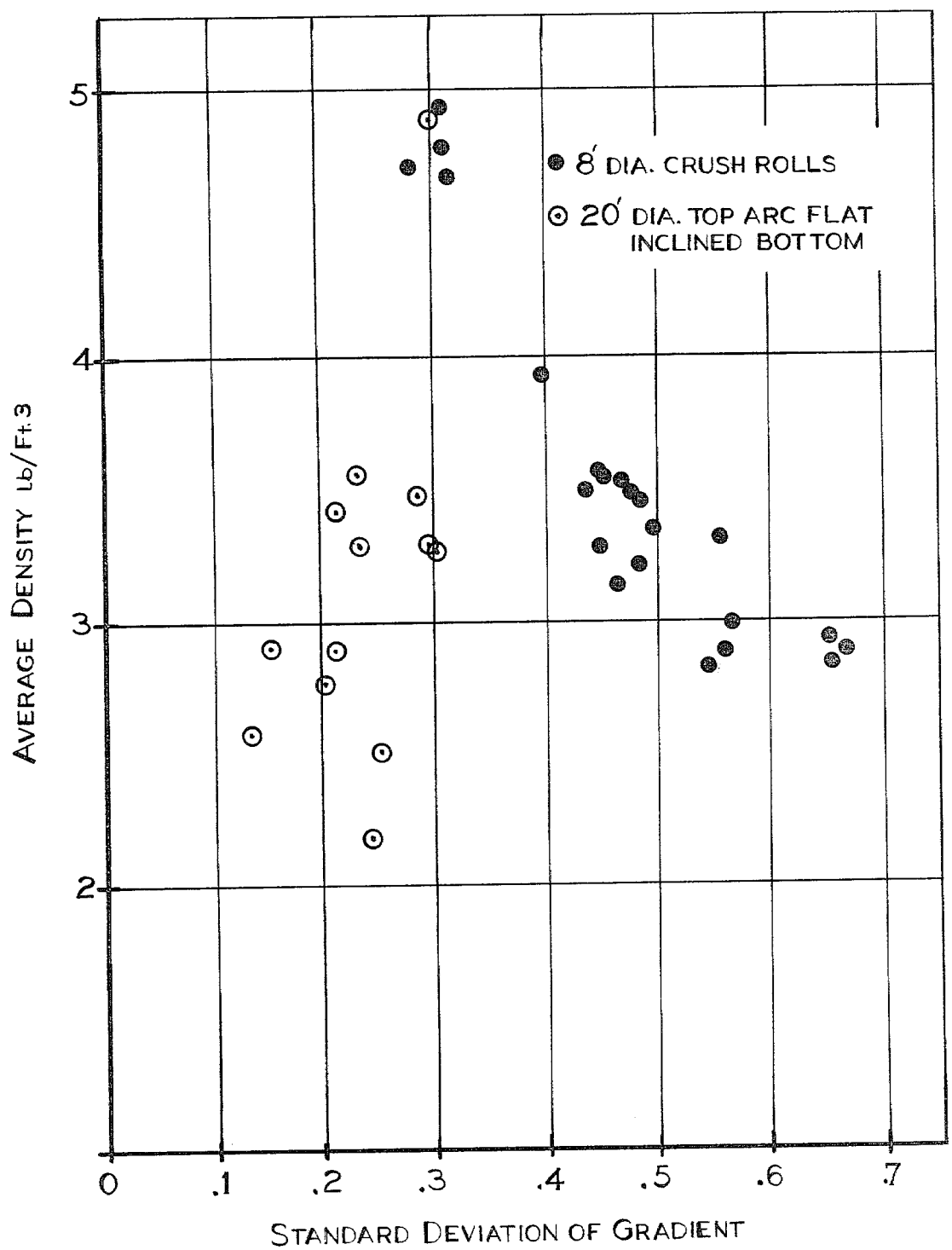

IMPROVED APPARATUS FOR CRUSING PARTIALLY CURED FREELY RISEN FOAM

This is a division, of application Ser. No. 932,246, filed Aug. 9, 1978 now U.S. Pat. No. 4,134,945, which is a continuation-in-part of U.S. patent application Ser. No. 738,262, filed Nov. 2, 1976.

This invention relates to an improvement in apparatus for making flexible densified polyurethane foam, and more particularly to apparatus for crushing the partially cured freely risen foam.

In U.S. Pat. No. 3,506,600, issued Apr. 14, 1970 to N. C. Zocco et al, there is disclosed a method of making densified polyurethane foam wherein the partially cured, freely risen foam is crushed between two rotating crusher rollers. After crushing between the crusher rollers, the foam is permitted to completely cure and is cut into predetermined lengths, either before or after being completely cured. The top and bottom of the foam lengths may, due to the nature of the process, have a relatively thin outer layer of very low density foam which is usually trimmed off. Then, depending upon the application, the foam length is either maintained in its original thickness, or sliced horizontally to provide a plurality of sheets from one original foam length.

Prior to the present invention, even though extensive efforts have been made to optimize the time after the foam has risen and the start of the crushing or densifying process, the density gradient across the vertical section remains significantly large. In fact, the density gradient is significantly large such that the range of densities exceed the normal product density tolerance causing more than one product to be produced when the foam length is horizontally sliced into a plurality of sheets. The economic implication of this is the production of by-product material which is either not useful or is not needed at the present time and which requires storage and necessitates an undue buildup of inventory.

SUMMARY OF THE INVENTION

It has been found that in accordance with the present invention, polyurethane foam can be produced and densified in such a way that the density gradient through a given cross section is reduced and the by-product material is minimized.

More specifically, it has been found that densified polyurethane foams can be prepared by allowing a polyurethane foam forming reaction mixture to rise thereby forming a partially cured, free risen cellular material. The partially cured cellular material has a compressive force applied to it by means of a crush conveyer having an upper arcuate crushing section of a radius such that the ratio of the radius to the free-rise height of the partially cured foam is at least 1.1 to 1 or greater. The crush conveyor also includes a bottom crushing section which may be arcuate with a radius of a dimension such that the ratio of the radius to the free-rise height of the partially cured foam is also 1.1 to 1 or greater. The bottom crushing section may have a radius the same as or greater than the top crushing section.

As an alternative, the bottom crushing section may be planar and may be horizontal or inclined with respect to the horizontal.

DESCRIPTION OF THE DRAWINGS

The present invention may be more readily understood by reference to the following description of various embodiments of the present invention and to the accompanying drawing in which:

FIG. 2 is a plot of the standard deviation of the density gradient from the average density of various foam samples for different average densities and showing data for samples produced according to the known process and data for samples produced according to an embodiment of the present invention;

Figure 1:
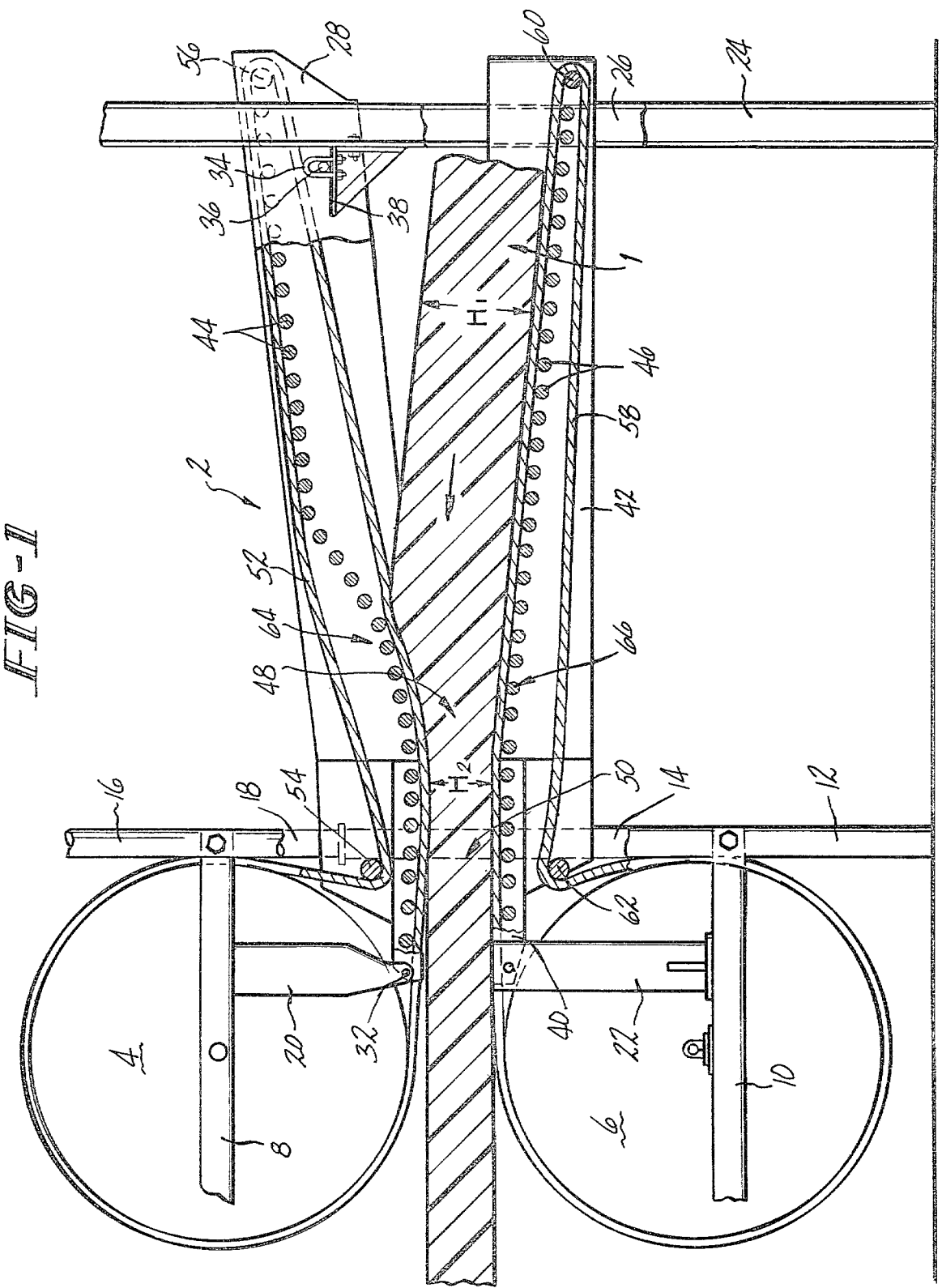
FIG. 1 is a side view partially in section of a crush conveyor mechanism for use in practicing the present invention.

The present invention is particularly applicable to the continuous process of producing densified polyurethane foam. In the typical process, the foam-forming ingredients are admixed in a suitable mixing head and the resulting mixture fed to a moving conveyor having suitable side-retaining means to contain the liquid reactant. The side-retainers are necessary until the foam gels sufficiently to support its own weight. As the reaction proceeds while moving along the conveyor, bubbles form in the reaction mixture which affects a volume increase and the formation of an uncured porous gel. After the uncured porous gel has traveled along the conveyor for a predetermined period of time, the partially cured freely risen foam 1 is passed to a crush conveyor mechanism 2 such as shown in FIG. 1. The partially cured, freely risen foam has a height $H_1$.

As shown in FIG. 1, the crush conveyor mechanism 2 may include upper and lower drive rollers 4 and 6 respectively which are journaled at each end to suitable support brackets 8 and 10. The lower support brackets 10 are mounted on vertically extended support poles 12 and 14, pole 14 being positioned behind pole 12 in the view shown in FIG. 1. While FIG. 1 only shows the right-hand end of the brackets 8 and 10 being mounted to a support pole 12, it is to be understood that the left-hand ends may also be supported by a set of poles if desired.

The support poles 12 and 14 include upper telescoping sections 16 and 18 to which the right-hand end of the upper support brackets 6 are attached. Section 18 is positioned behind section 16 as shown in FIG. 1. If a second set of poles are used to support the left-hand end of the brackets 10, such poles should also be provided with telescoping sections to support the left-hand end of the brackets 8.

Mounted to and extending downwardly from each support bracket 8 is a support arm 20. An upwardly extending support arm 22 is attached to each of the lower support bracket 10.

A second set of support poles 24 and 26 is provided at a point upstream from support poles 12 and 14. A set of horizontally opposed, upper roller supporting brackets 28 and 30 have their downstream end attached to the free end of support arm 20 by a pivot pin 32. The upstream end of each of the upper roller supporting brackets 28 and 30 is positioned on the inside of its respective support pole 24 and 26 and is pivotally attached by means of a U-Bolt 34 surrounding a pivot pin 36. The U-bolt 34 is attached to a bracket 38 which in turn is attached to its respective pole 24 or 26.

A set of horizontally opposed lower roller supporting brackets 40 and 42 have their downstream ends attached to the free end of the support arms 22. The upstream end of each lower roller supporting bracket 40 and 42 is positioned on the inside of its associated pole 24 or 26 and is attached thereto by any suitable means such as the pin bracket, and U-bolt arrangement used in connection with the upper roller supporting brackets 28 and 30.

A series of upper rollers 44 extend between the set of upper rollers support members. Similarly, a set of bottom rollers 46 extend between the two lower roller support members. According to the embodiment shown in FIG. 1, the bottom rollers 46 define a path which is generally flat and inclined upwardly toward the downstream end of the conveyor 2 and a downstream flat horizontal portion. The upper rollers 44 are spaced from the lower rollers in such a manner as to provide crushing section 48 of a predetermined height $H_2$ to provide the desired average density, and a downstream discharge section 50.

An upper conveyer belt 52 extends about the drive roller 4, under an idler roller 54, over an idler roller 56 and back to the drive roller 2. In like manner, a lower conveyor belt 58 extends around the drive roller 6, over an idler roller 60, over idler roller 62 and back to the drive roller 6.

Both the upper and lower conveyor belts 52 and 58 have sufficient slack such that when the partly cured freely risen polyurethane foam ethers the conveyor mechanism 2, the conveyor belts 52 and 58 are pushed against the rollers 44 and 46 and the belts 52 and 58 assume the path of the rollers heretofore mentioned.

More in detail, the conveyor mechanism 2 includes an upper arcuate crushing portion 64 which is disposed opposite a flat inclined bottom crushing portion 66. The arcuate section has a radius "R" which is of a dimension such that the ratio of the arc radius to the free-rise height of foam is greater than 1.1 to 1 and preferably greater than 2 to 1. Although the ratio of arc radius of the upper crushing section to freely risen foam height may be theoretically as large as desired, the preferred operating range is a ratio of between about 2 to 1 to about 10.5 to 1.

The angle of incline of the planar bottom crushing section may vary from being horizontal up to about 10°, although 6° or less is preferred. The incline may be upwardly or downwardly toward the downstream end.

As an alternative embodiment, the bottom crushing section 66 may be arcuate in a manner similar to the top crushing section 64. The radius of the arc should be sufficiently large to provide a ratio of the radius of the arc to the freely risen height of the foam which is greater than 1 to 1 and preferably greater than 2 to 1. If an arcuate crushing section is used for the bottom crushing section 66, the radius of the bottom arc may be the same as or greater than the radius of the top crushing section 64.

In the preparation of densified urethane foam using this invention, either the so-called "one-shot method" or the "semi-prepolymer technique" ("quasi-prepolymer") may be employed. Any combination of polyols, including polyether polyols and polyester polyols, organic polyisocyanate, foaming agent, catalyst and other reactants capable of forming a flexible urethane foam can be employed in carrying out the process of this invention, and the term "polyurethane foam forming reaction mixture" in the specification and claims herein is meant to include any such combination. Typical formulations are described in U.S. Pat. No. 3,072,582, issued Jan. 8, 1963 and Canadian Pat. No. 705,938, issued Mar. 16, 1965.

While, as indicated above, both polyether and polyester polyols can be employed in the practice of this invention, preferred embodiments utilize the polyether polyols in the preparation of the polyurethane foam forming reaction mixture. To further illustrate suitable formulations, the polyether polyols, useful for the preparation of the polyurethane foams, include oxyalkylated polyhydric alcohols having a molecular weight in the range between about 700 and about 10,000 and preferably between about 1,000 and 6,000. The hydroxyl number of the polyether polyol is generally less than about 250 and preferably in the range between about 25 and about 175. These oxyalkylated polyhydric alcohols are generally prepared by reacting in the presence of an alkaline catalyst, a polyhydric alcohol and an alkylene oxide such as ethylene oxide, propylene oxide, butylene oxide, amylene oxide, epichlorohydrin, and mixtures of these alkylene oxides, by either random addition or step-wise addition.

Polyhydric alcohols suitable for use in preparing the polyether polyol include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, mixtures thereof and the like. If desired, a portion or all of the polyhydric alcohol may be replaced with another compound having at least two reactive hydrogen atoms, such as alkyl aminnes, alkylene polyamines, cyclic amines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic acid, succinic acid, glutaric acid, aconotic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine can also be employed. Mixtures of oxyalkylated polyhydric alcohols are also suitable for use in the process of this invention.

The organic polyisocyanates used in the preparation of the polyurethane foams include toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene-1,5-diisocyanate, polyphenylene polymethylene isocyanate, mixtures thereof and the like. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH groups times 100 is referred to as the "index".

The partially cured polyurethane foams are prepared in the presence of a foaming agent, reaction catalysts, and preferably a small proportion of a conventional surfactant. The foaming agent employed may be any of those known to be useful for this purpose, such as water, as well as organic foaming agents containing up to about seven carbon atoms such as the halogenated hydrocarbons, lower molecular weight alkanes, alkenes, ethers and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to 50 parts by weight per 100 parts by weight of the polyol, and generally water is employed in an amount from about 1.0 to 6.0 parts by weight per 100 parts by weight of the polyol.

The polyurethane foams are prepared in the presence of a catalytic amount of a reaction catalyst. The catalyst employed may be any of the catalysts known to be useful for this purpose, or mixtures thereof, including tertiary amines and metallic salts, particularly stannous salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalysts may be employed. Preferably, a mixture of amine and metallic salt is employed as the catalyst. The catalyst or catalyst mixture, as the case may be, is usually employed in an amount ranging between about 0.05 and about 1.5, and preferably between about 0.075 and about 0.50 percent by weight of the polyol.

It is preferred in the preparation of the polyurethane foams to also employ minor amounts of a conventional surfactant in order to further improve the cell structure of the polyurethane foam. Typical of such surfactants are the silicone oils and soaps, and the siloxaneoxyalkylene block copolymers. U.S. Pat. No. 2,834,748 and T. H. Ferrigno, *Rigid Plastic Foams* (New York: Reinhold Publishing Corp., 1963), p. 38–42, disclose various surfactants which are useful for this purpose. Generally up to 2 parts by weight of the surfactant are employed per 100 parts of the polyol.

Various additives can be employed which serve to provide different properties, e.g., fillers such as barytes, clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added. Also, a phosphorous containing burning rate retardant such as tetrakis (2-chloroethyl) ethylene disphosphate or tris(dichloroprophyl)phosphate may also be added.

In practicing the present invention, the polyurethane foaming reaction mixture comprising the above described ingredients is fed to a suitable reaction zone such as by pouring onto a moving conveyor belt where the reaction proceeds. The foaming reaction is exothermic and auxiliary heat is not needed to effect the reaction though it can, of course, be employed. After the reactants have been admixed for a period of about between 0.1 and about 20 seconds, an emulsion or cream forms. As the temperature increases from the reaction, gas bubbles are generated which cause the formation of an uncured cellular gel material which gradually increases in volume.

After generation of gas bubbles is completed, the rise of the uncured cellular gel material stops. At this point, the method and apparatus according to the teaching of the present invention is employed to provide densified foam compositions.

The period of time which elapses between the completion of the rise of the uncured cellular foam and the first application of pressure to the partially cured foam to affect crushing of the foam (hereinafter referred to as "crush time") may vary. Generally, it is desirable that the "crush time" be from about 0 to about 10 minutes and preferably from about 0 to about 6 minutes. Although flexible densified polyurethane foams can be provided immediately after completion of the rise, practical operations require at least about 6 seconds to elapse prior to crushing.

It has also been found desirable to maintain the temperature of the ambience during crushing within certain limits which is related to "crush time". In the case where the "crush time" is between about 0 and 2.5 minutes, temperatures between about 45° and about 200° F. and preferably between 45° and about 100° F. may be employed. Narrower temperature ranges may be utilized when the partially cured cellular material is maintained for a longer "crush time". Thus, when the time interval is between 2.5 and about 5 minutes, temperatures between about 45° and 200° F. and preferably between about 45° and 100° F. may be maintained, while temperatures between about 45° and 110° F. and preferably between 45° and about 85° F. may be employed for "crush times" of about 5 to about 10 minutes.

Conventional means such as ovens and cooling systems may be employed as necessary to provide the desired temperatures. In commercial operations it is particularly preferred to operate under environmental conditions and thus temperatures from about 70° to about 110° F. are employed while maintaining the "crush time" within the broad range of 0 to 10 minutes.

At the end of the "crush time", the partially cured polyurethane foam is compressed by the apparatus and method described above. The degree of deflection necessary to provide good densified foams may vary depending upon the desired average density. It has been found desirable to compress the partially cured cellular material to between about ⅔ and 1/10 of its original thickness after rise. The greater the degree of deflection, the greater will be the average density of the crushed foam.

The desired degree of compression may be achieved by adjusting the opening $H_2$ between the upper and lower crushing portions 64 and 66 of the apparatus shown in FIG. 1. This may be accomplished by moving the telescoping poles 16 and 18 in a vertical direction permitting the upper roller mounting brackets 28 and 30 to pivot about pivot pin 36.

After the partially cured polyurethane foam has been subjected to compression by the crushing conveyor mechanism 2, the curing of the compressed material may be completed. While curing can be accelerated by the application of heat, such treatment is not necessary since the foam will completely cure under ambient conditions.

After removal of the compressing force and completion of the curing, the densified foam may recover a small portion of the difference between its initial height and the crushing gap. The degree of recovery depends upon the particular process variables. If the foam has been densified, it is apparent that it will never regain its original dimensions.

The following examples are presented to illustrate the invention more fully without any intention of being limited thereby.

A polyurethane foam forming reaction mixture was prepared from the following ingredients in the indicated proportions:

| Ingredients: | Parts by weight |
|---|---|
| Oxypropylated glycerin (Moleculor weight 3000) | 100 |
| Toluene diisocyanate (80/20, 2,4/2,6 isomer mixture; 110 index) | 47.8 |
| Water | 3.6 |
| Silicone surfactant (Dow Corning DC-190') | 1.0 |
| Amine catalyst (33% solution of triethylene diamine in diprophylene glycol) | .25 |
| Stannous octoate | .5 |
| Tris (dichloropropyl) phosphate | 10 |

This surfactant is a block copolymer of a polydimethylsiloxane and a polyether resin.

The above reaction mixture, which had a free rise density of approximately 1.66 pcf (pounds per cubic foot) was utilized to prepare a series of lengths of partially cured, fully risen foam, by pouring a sufficient amount of the mixture at a sufficient rate onto a moving conveyor to provide a free rise height of approximately 45 inches for each sample. A first set of the samples was conveyed to and passed between two 8 foot diameter crush rollers spaced apart varying amounts to provide samples having an average density of between 2.8 and 5 pcf. The two 8 foot diameter crush rollers represent the prior art technique. The actual density was calculated at various points from top to bottom across the vertical axis of the sample to obtain the density gradient. The standard deviation of these densities with the average sample density was calculated. This gradient standard deviation provides an indication of the density gradient range which should be as small as possible. The dark data points in FIG. 2 show the gradient standard deviation plotted for a range of average densities for samples crushed between 8' diameter crush rollers.

A second set of samples was conveyed to a crush conveyor mechanism of the type shown in FIG. 1 wherein the top crushing section had a radius of 10 feet and the bottom crushing section was planar and inclined upwardly from the horizontal 4°. The minimum height $H_2$ of the crushing section, (crush height) was varied to provide samples having average densities between about 2 and about 5 pcf. The standard deviation of the density of each sample at various points across the vertical axis with the average sample density was calculated.

The light data points in FIG. 2 show the gradient standard deviation plotted for a range of average densities for these samples.

As can be seen from the graph of FIG. 2, the samples crushed between a 10 foot radius top arc and flat inclined bottom exhibited a lower gradient standard deviation than did the samples crushed between two 8 foot diameter crush rollers. As the height of the partially cured samples in all cases was approximately 45 inches, the ratio of the arc radius to foam height for the 20 foot diameter top roll was 2.67. In the case of the 8 foot diameter crush rolls, the ratio of arc radius to partially cured, fully risen foam height was 1.07. The graph of FIG. 2 thus indicates that the density gradient of the foam produced using a conveying mechanism according to the present invention as compared to that produced by previous practice was substantially lower, especially in the lower average density ranges.

Another foam forming reaction mixture was prepared similar to that set forth above with the exception that four parts by weight of Tetrakis (2-chloroethyl) ethylene diphosphate was used in place of the 10 parts by weight of Tris (dichloropropyl) phosphate. A foam sample was prepared by pouring the foam forming reaction mixture onto a moving conveyor to provide partially cured, fully risen foam sample having a height of about 27 inches. The sample was conveyed to a crush conveyor mechanism of the type shown in FIG. 1 having a top arcuate crushing member of 11 foot radius and a bottom crushing mechanism of arcuate shape having a 22 foot radius. The crush opening $H_2$ was 11 inches. The sample, after crushing, regained a portion of its height, having a final height of 14.5 inches. The density of the sample was ascertained at 0.5 inch intervals across its vertical cross-section. The density at the various sample depths is shown plotted in FIG. 3. The average density of the sample was 2.66 pounds per cubic foot.

Figure 3:
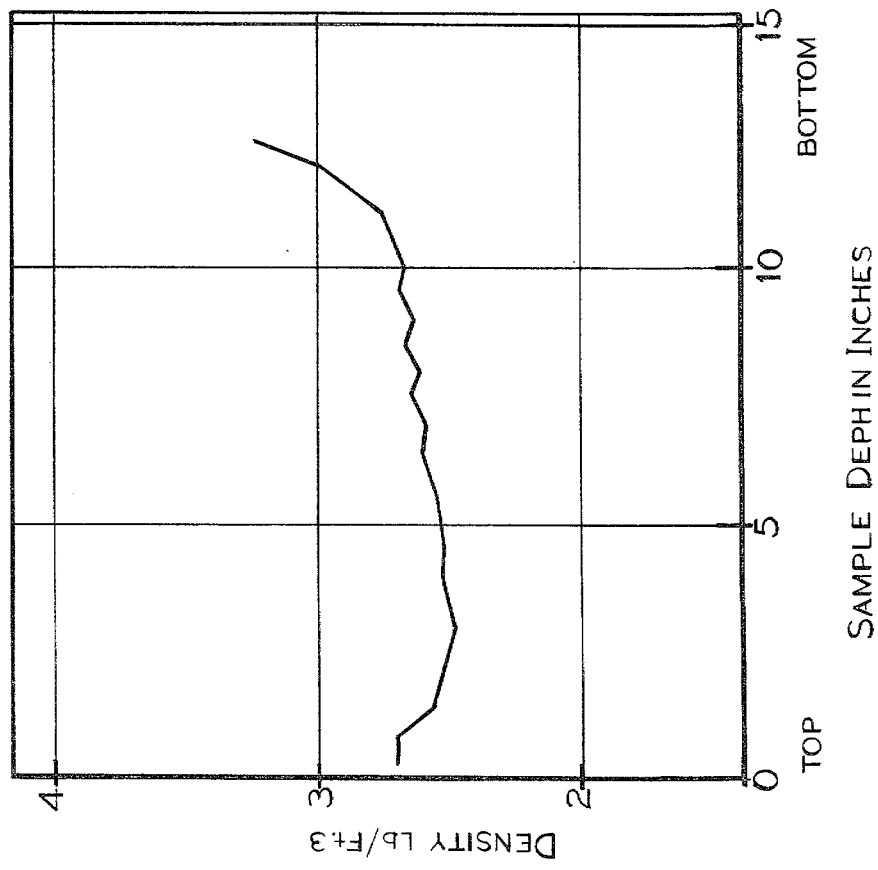
FIG. 3 is a graph plotting the density versus the depth of a sample, the sample being prepared according to one embodiment of the present invention.

The same foam forming reaction mixture used in connection with FIG. 3 was poured onto a moving conveyor to provide a sample having a height of about 26 inches. The fully risen sample, before being completely cured, was transported to a pair of crush rollers each of which had a radius of 2 feet. The crush opening was 11 inches. After crushing and curing, the height of the foam sample was 14 inches and had a density of 2.64 pcf. The density at various sample depths were ascertained and plotted in FIG. 4.

Figure 4:
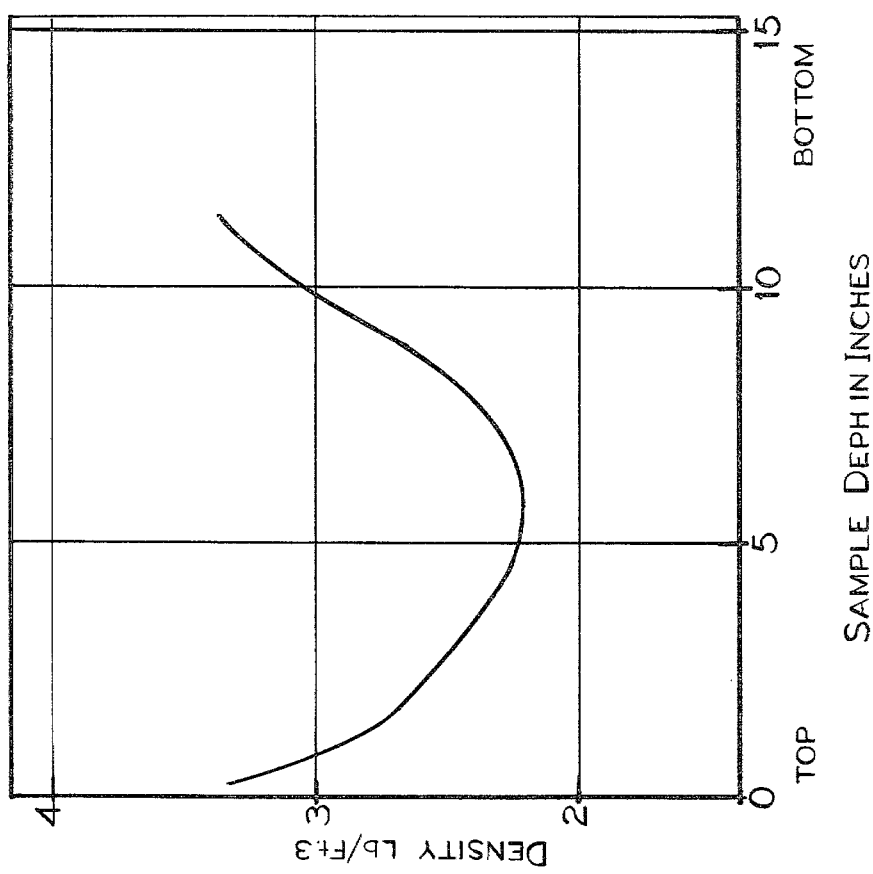
FIG. 4 is a graph plotting density versus the depth of a sample, the sample being prepared according to the known process.

As can be noted from the comparison of FIGS. 3 and 4, the sample using the crush conveyor mechanism with a top arc of 11 foot radius and bottom arc of 22 foot radius had a generally flatter curve, and thus less variation in density, than did the sample crushed between the 4 foot diameter crush rollers.

Another series of samples were prepared utilizing the foam forming reaction mixture used in connection with the examples of FIGS. 3 and 4. These samples were crushed between either crush rollers, or a crush conveyor mechanism having various arc radii to freely risen foam height ratio as indicated in Table 1. The average sample density and density gradient standard deviation were calculated. As will be seen from Table 1, for a given avarage sample density, the utilization of the crush conveyor mechanism wherein the arc radius to sample height ratio has been increased over that previously used, resulted in a lower density gradient standard deviation, indicating that the foam so produced had a more uniform density.

TABLE I

| | TOP Arc radius/ foam height | BOTTOM Arc radius/ foam height | AVG. SAMPLE DENSITY | DENSITY GRADIENT STANDARD DEVIATION |
|---|---|---|---|---|
| 1. | 8/22 (.36) | 8/22 (.36) | 2.6 2.65 | .82 .83 |
| 2. | 24/26 (.92) | 24/26 (.92) | 2.4 3.0 4.0 5.0 | .6 .5 .35 .2 |
| 3. | 48/47 (1.02) | 48/47 (1.02) | 2.8 3.0 4.0 5.0 | .7 .64 .4 .28 |
| | Old process | | | |
| 4. | 48/47 (1.1) | 48/47 (1.1) | 3.0 4.0 5.0 | .6 .4 .35 |
| | EXAMPLE 1 | | | |
| 5. | 120/45 (2.67) | Flat (inf.) | 2.4 3.0 4.0 | .23 .19 .3 |
| | EXAMPLE 1 | | 5.0 | .35 |
| 6. | 5.1 | 5.1 | 2.4 3.0 4.0 5.0 | .32 .26 .19 .15 |
| 7. | 5.1 | 5.1 | 2.4 3.0 4.0 5.0 | .29 .23 .17 .15 |
| 8. | 5.1 | Flat | 2.4 3.0 | .23 .21 |
| 9. | Flat | Flat | 2.6 | .10 |

As the examples point out, the increased radius of the upper crushing portion used in conjunction with a bottom crushing portion having either an increased radius or planar configuration, results in lower density gradients as compared with the conventional process while decreased radius caused higher density gradients than did the conventional process. Without any intent to be bound hereby, it is theorized that the large density gradient produced by the convention process is the result of horizontal shear forces evolving from a large ratio of vertical crush distance to horizontal travel of the foam. The present invention reduces this ratio through the provision of a crush conveyor utilizing a crushing portion of a relatively large arc.

What is claimed is:

1. In an apparatus for making flexible densified polyurethane foam from a polyurethane foam-forming reaction mixture that is allowed to rise to a free risen height and is crushed before being completely cured, the improvement comprising:
   crush conveyor means for crushing said partially cured freely risen foam as said foam is being conveyed, said conveyor means including an upper arcuate crushing portion having a radius of a dimension such that the ratio of the arc radius to height of the freely risen foam is greater than 1.1 to 1.0, and a bottom crushing portion oppositely disposed from the upper arcuate crushing portion, said bottom crushing portion comprising a planar section.

2. The apparatus of claim 1 wherein said bottom crushing section is inclined upwardly toward the downstream end of the conveyor means.

3. The apparatus of claim 2 wherein said bottom crushing section is inclined less than 10°.

4. The apparatus of claim 1 wherein said ratio is between about 2 to 1 and about 10.5 to 1.

5. The apparatus of claim 1, further including means for permitting the distance between the upper arcuate crushing portion and lower crushing portions to be changed.

* * * * *